United States Patent
Klinger

(10) Patent No.: US 11,648,975 B2
(45) Date of Patent: May 16, 2023

(54) STEERING SHAFT FOR A STEERING SYSTEM OF A MOTOR VEHICLE, IN PARTICULAR A PASSENGER CAR, AND MOTOR VEHICLE

(71) Applicant: AUDI AG, Ingolstadt (DE)

(72) Inventor: Thomas Klinger, Ingolstadt (DE)

(73) Assignee: AUDI AG, Ingolstadt (DE)

(*) Notice: Subject to any disclaimer, the term of this patent is extended or adjusted under 35 U.S.C. 154(b) by 462 days.

(21) Appl. No.: 16/971,037

(22) PCT Filed: Jan. 18, 2019

(86) PCT No.: PCT/EP2019/051263
§ 371 (c)(1),
(2) Date: Aug. 19, 2020

(87) PCT Pub. No.: WO2019/158309
PCT Pub. Date: Aug. 22, 2019

(65) Prior Publication Data
US 2021/0086817 A1    Mar. 25, 2021

(30) Foreign Application Priority Data
Feb. 19, 2018  (DE) .............. 10 2018 202 456.1

(51) Int. Cl.
*B62D 1/19* (2006.01)
*B62D 1/20* (2006.01)

(52) U.S. Cl.
CPC .............. *B62D 1/192* (2013.01); *B62D 1/20* (2013.01)

(58) Field of Classification Search
CPC .. B62D 1/192; B62D 1/20; B62D 1/16; F16C 3/03; F16D 2001/103; F16D 3/06; F16D 3/12; F16D 3/58; F16D 3/62
See application file for complete search history.

(56) References Cited

U.S. PATENT DOCUMENTS

| | | | |
|---|---|---|---|
| 3,691,865 A | 9/1972 | McElwain | |
| 5,580,314 A | 12/1996 | Moriyama et al. | |
| 2019/0101213 A1* | 4/2019 | Walser | B62D 1/20 |

FOREIGN PATENT DOCUMENTS

| | | |
|---|---|---|
| CN | 102030029 A | 4/2011 |
| CN | 103562046 A | 2/2014 |

(Continued)

OTHER PUBLICATIONS

Office Action dated Feb. 23, 2022, in connection with corresponding Chinese Application No. 201980013966.X (13 pp., including machine-generated English translation).

(Continued)

*Primary Examiner* — Drew J Brown
(74) *Attorney, Agent, or Firm* — Maier & Maier, PLLC

(57) ABSTRACT

A steering shaft for a steering system of a motor vehicle, having at least two steering shaft elements, which can be rotated about an axis of rotation, are coupled to one another in a torque-transmitting manner, and are telescopically slidable one inside the other, via which a steering wheel is mechanically connectable to a steering gear of the steering system, wherein at least one of the steering shaft elements has at least two shaft parts, which are formed separately from one another and are connected to one another in a rotationally-fixed manner and which are assembled and connected to one another with at least one separation point, wherein the steering shaft elements are slidable one inside the other beyond the separation point.

20 Claims, 1 Drawing Sheet

(56) References Cited

FOREIGN PATENT DOCUMENTS

| CN | 106536324 | A |   | 3/2017  |             |
|----|-----------|---|---|---------|-------------|
| CN | 112208622 | A | * | 1/2021  | B62D 1/185  |
| CN | 112303140 | A | * | 2/2021  |             |
| DE | 1116551   | B |   | 11/1961 |             |
| DE | 69018757  | T2|   | 8/1995  |             |
| DE | 102005028054 | B3 |   | 12/2006 |          |
| DE | 102014105822 | A1 |   | 10/2015 |          |
| DE | 102015015728 | A1 | * | 5/2016 |           |
| DE | 102018208745 | A1 | * | 12/2019 | B62D 1/192 |
| EP | 0878376   | A2 |   | 11/1998 |            |
| JP | S62-192974 | U |   | 12/1987 |            |
| KR | 1020100135134 | A |   | 12/2010 |          |
| KR | 1020140042150 | A |   | 4/2014  |           |
| WO | 2017/182430 | A1 |   | 10/2017 |           |
| WO | WO-2018196960 | A1 | * | 11/2018 | F16C 3/023 |

OTHER PUBLICATIONS

International Search Report (with English translation) and Written Opinion (with Machine translation) dated May 16, 2019 in corresponding International Application No. PCT/EP2019/051263; 18 pages.

Examination Report dated Mar. 8, 2022, in connection with corresponding German Application No. 102018202456.1 (15 pp., including machine-generated English translation).

Notification of Transmittal of Translation of the International Preliminary Report on Patentability dated Sep. 3, 2020, including the Written Opinion of the International Search Authority, in connection with corresponding international Application No. PCT/EP2019/051263 (7 pp.).

* cited by examiner

STEERING SHAFT FOR A STEERING SYSTEM OF A MOTOR VEHICLE, IN PARTICULAR A PASSENGER CAR, AND MOTOR VEHICLE

The disclosure relates a steering shaft for a steering system of a motor vehicle, in particular a passenger car. Furthermore, the invention relates to a motor vehicle.

BACKGROUND

Such a steering shaft for a steering system of a motor vehicle, in particular a passenger car, is already known, for example, from DE 10 2005 028 054 B3. The steering shaft comprises at least two steering shaft elements, which are rotatable around an axis of rotation, are coupled to one another in a torque-transmitting manner, and are telescopically slidable one inside the other, via which a steering wheel of the steering system is mechanically connectable to a steering gear of the steering system, in particular in such a way that torques exerted on the steering wheel are transmittable from the steering wheel via the steering shaft and thus via the steering shaft elements to the steering gear.

Furthermore, EP 0 878 376 A2 discloses a steering shaft for transmitting steering torques, wherein the steering shaft has a load booster which is inelastically deformable under load.

In addition, DE 690 18 757 T2 discloses a rod made of solid material, the cross section of which indicates an increased buckling capacity.

SUMMARY

The object of the present invention is to provide a steering shaft and a motor vehicle, so that particularly simple assembly of the steering shaft and particularly advantageous accident behavior can be implemented.

A first aspect of the invention relates to a steering shaft for a steering system of a motor vehicle, in particular a passenger car. The steering shaft has at least two steering shaft elements which are rotatable around an axis of rotation and which are preferably formed separately from one another. The steering shaft elements are coupled to one another in a torque-transmitting manner, in particular in such a way that torques can be transmitted between the steering shaft elements. In addition, the steering shaft elements are telescopically slidable one inside the other, wherein a steering wheel is mechanically connectable to a steering gear of the steering system via the steering shaft elements, in particular in such a way that torques exerted on the steering wheel are transmittable from the steering wheel via the steering shaft and thus via the steering shaft elements to the steering gear. The steering shaft elements are rotatable around the axis of rotation, to thus cause steering movements of wheels of the motor vehicle.

In other words, the motor vehicle in its completely produced state has the wheels and the steering system, which comprises the steering shaft. The wheels are rotatably held on a body of the motor vehicle, in particular designed as a self-supporting vehicle body, and are pivotable around a respective steering axis in relation to the vehicle body and are thus steerable, wherein by steering or pivoting the wheels around the steering axes, lane changes, direction changes, and/or cornering of the motor vehicle can be effectuated. In the completely produced state of the motor vehicle, the steering wheel is mechanically connected to the steering gear via the steering shaft and thus via the steering shaft elements, so that torques exerted on the steering wheel are transmittable or are transmitted from the steering wheel to the steering shaft and from the steering shaft to the steering gear. The above-mentioned torques are exerted by a person, for example, in particular by the driver of the motor vehicle, on the steering wheel to rotate the steering wheel and thus steer the wheels.

In particular, the steering shaft can be designed as an intermediate steering shaft. The steering system comprises, for example, a steering column on which, for example, the steering wheel is rotatably held. In particular, the steering wheel can be connected in a rotationally-fixed manner to the steering column. In the completely produced state, for example, the steering column is mechanically connectable or connected via the intermediate steering shaft to the steering gear, in particular in such a way that the above-mentioned torques exerted on the steering wheel are transmittable from the steering wheel to the steering column, from the steering column to the intermediate steering shaft, and from the intermediate steering shaft to the steering gear.

The feature that the steering shaft elements are telescopically slidable one inside the other is also referred to as telescoping, in the context of which, for example, the steering shaft elements are at least partially arranged one inside the other and are slidable one inside the other, in particular along the axis of rotation. The telescoping is used, for example, in the course of installing the steering shaft in order to at least temporarily slide the steering shaft elements one inside the other by means of the telescoping during the assembly. This can shorten the length of the steering shaft so that the steering shaft can be installed. After the installation or after a preassembly, for example, the steering shaft elements can be pulled apart from one another or can slide apart from one another again due to the telescoping.

Furthermore, the telescoping, in particular after installation, is used, for example, to implement advantageous accident behavior. For example, if accident-related application of force extending at least along the axis of rotation to the steering system and thus the steering shaft occurs in the course of an accident, for example, the steering shaft elements thus slide telescopically one inside the other. In this way, an accident-related rearward displacement or rearward movement of the steering gear extending to the rear in the vehicle longitudinal direction can be permitted, without an excessive accident-related rearward displacement of the steering wheel or the steering column occurring.

In order to be able to implement a particularly simple and thus time-saving and cost-effective installation of the steering shaft and thus the steering system as a whole and a particularly advantageous accident behavior, it is provided according to the invention that at least or exactly one of the steering shaft elements has at least two shaft parts formed separately from one another and connected to one another in a rotationally-fixed manner, which are assembled and connected to one another at at least or precisely one separation point, wherein the steering shaft elements are slidable one inside the other across the separation point. This means that the above-described telescoping can take place across the separation point or through the separation point, so that the steering shaft elements can slide particularly far one inside the other. As a result, a particularly large, accident-related rearward displacement of the steering gear can be permitted without excessive rearward displacement or intrusion of the steering wheel into the interior occurring.

In addition, in comparison to an integral design of the at least one steering shaft element, at least one separation point is provided, at which the at least two shaft parts formed separately from one another of the at least one steering shaft element are assembled and connected to one another. In this way it is possible to install the shaft parts independently or separately from one another and thus in succession, for example, whereby the steering shaft can be installed particularly easily overall.

The invention is based in particular on the following finding here: During the installation of the steering shaft, designed as an intermediate steering shaft, for example, two options are fundamentally conceivable: In a first of the options, for example, the steering shaft is installed before the steering column, so that firstly the steering shaft is installed and then the steering column. In the first option, after the installation of the steering column, which is generally inserted with a cockpit into the interior, an upper universal joint is to be inserted as a connection between the steering shaft and the steering column. In the second option, the steering shaft is preassembled on the steering column and is inserted together with the steering column and the cockpit into the interior. In this case, the steering shaft is to be moved past a door cutout, for example, and threaded through a hole in an end wall. The first option has the disadvantage that the installation of the upper universal joint in a foot well is very complex, since, for example, the universal joint or a point at which the universal joint is arranged is very difficult to access in the foot well, in particular using a screwing tool for fastening the universal joint. In addition, there has to be an axial displacement path for threading the universal joint, which is implementable in the foot well only with difficulty or not at all.

The second option has the disadvantage that the second option is a type of installation that is only possible up to a maximum length of the steering shaft, for example in order to get past the door cutout with the aid of complex guide systems and to be able to thread the steering shaft through the end wall. To reduce the length of the steering shaft, it is sometimes necessary to install a lower universal joint not on the steering shaft but on the steering gear. In this case, the installation of the lower universal joint is very complex and difficult because two loose ends in the form of one end of the universal joint and one end of the steering shaft have to be connected to one another, in particular at a point which is not accessible or is only accessible with great effort.

The above-mentioned disadvantages can now be avoided by means of the steering shaft according to the invention, so that the steering shaft according to the invention can be installed particularly easily. In addition, a length of the telescoping, which extends in particular along the axis of rotation, is typically limited for reasons of geometry, since the telescoping is first positioned above or below the separation point also referred to as a connection point and can only take place up to the connection point, but not beyond it. In addition, a residual overlap of the two steering shaft elements designed or functioning as telescopic parts is to be provided for normal operation. The maximum rearward movement of the steering gear encase of an accident is thus also limited, so that typically corresponding vehicle body measures have to be found to at least limit excessive indentation in the event of an accident. However, this is contrary to the desire for the softest possible cushioning. The above-mentioned disadvantages and problems can now be avoided by the invention, since the at least one steering shaft element is formed in multiple parts and the telescoping can take place beyond or across the separation point.

In one advantageous design of the invention, a first of the steering shaft elements has at least one toothed shaft having a first toothing and the second steering shaft element has at least one hollow shaft having a second toothing corresponding to the first toothing, wherein the steering shaft elements are connected to one another in a torque-transmitting manner via the toothings, which permit the telescopic sliding of the steering shaft elements one inside the other beyond the separation point. A particularly large telescoping can thus be implemented. The respective toothing is formed, for example, as spline toothing and/or as a spline.

In a further design of the invention, a joint, in particular a universal joint also referred to as a gimbal joint, is held on at least one of the steering shaft elements. In this way, for example, the installation of the at least one steering shaft element is simultaneously accompanied by the installation of the joint, so that a particularly simple and time-saving and cost-effective installation can be represented.

In one particularly advantageous embodiment of the invention, the toothed shaft is slidable along the axis of rotation through the hollow shaft and at the same time beyond the separation point into supporting contact with the universal joint. In this way, particularly large or maximum telescoping is implementable, since the tooth shaft can be inserted into the hollow shaft and can slide up to a stop on the universal joint. The steering shaft can thus, for example, at least temporarily be shortened in length considerably during its installation, so that the steering shaft can be handled and installed particularly easily. Furthermore, in case of an accident, the steering shaft elements can slide telescopically one inside the other by a particularly large distance, so that a particularly large accident-related rearward displacement of the steering gear can be permitted, without excessive rearward displacement of the steering wheel occurring.

To be able to install the steering shaft in a particularly simple manner and to be able to implement particularly advantageous noise behavior in a simple manner, in a further design of the invention, at least one elastically deformable decoupling element is provided at the separation point, via which the shaft parts are supported on one another along the axis of rotation. The elastically deformable decoupling element is formed, for example, from a metallic material, wherein the decoupling element can be designed, for example, as a spring. It is also conceivable that the decoupling element is formed from rubber. The decoupling element permits, for example, relative movements extending along the axis of rotation, which are translational in particular, between the shaft parts, wherein the decoupling element is elastically deformed between the shaft parts during such relative movements. In this way, for example, vibration energy is converted into deformation energy, whereby the relative movements and thus, for example, vibrations of the shaft parts are damped. This can prevent excessive noise.

In a further design of the invention, the at least one steering shaft element which has the shaft parts is arranged upstream of the other steering shaft element with respect to a torque flow extending from the steering wheel to the steering gear, so that the at least one steering shaft element is an upper steering shaft element and the other steering shaft element is a lower steering shaft element, which adjoins the upper steering shaft element toward the steering gear with respect to the torque flow. Thus, according to the invention, the upper steering shaft element is provided in multiple parts, in particular two parts, whereby a particularly simple installation of the steering shaft can be represented.

A further embodiment is distinguished in that the shaft parts are reversibly detachably connected to one another in a rotationally-fixed manner. This means that the shaft parts are non-destructively detachably connected to one another in a rotationally-fixed manner. For this purpose, the shaft parts are connected to one another, for example, frictionally or in a friction-locked and/or in a formfitting and rotationally-fixed manner, wherein preferably a material bond of the shaft parts is omitted or avoided. In this way, the shaft parts can be installed, for example, separately or in isolation from one another and in particular in succession and also assembled and thus connected to one another in a rotationally-fixed manner easily.

In order to install the steering shaft in a particularly simple manner, the shaft parts are, for example, screwed together with one another and thus reversibly detachably connected to one another in a rotationally-fixed manner. In addition, it is conceivable that the shaft parts are locked with one another or clipped with one another and thus reversibly detachably connected to one another. Alternatively or additionally, other connection technologies are possible, by means of which the shaft parts can be reversibly detachably connected to one another.

In a further advantageous embodiment of the invention, a grommet is held on one of the shaft parts and is penetrated by the one shaft part. The grommet is formed, for example, from an elastically deformable material, in particular from rubber. Since the grommet is held on the one shaft part, the installation of the one shaft part is simultaneously accompanied by the installation of the bushing, so that the steering shaft can be installed as a whole in a particularly time-saving and cost-effective manner.

By means of the grommet, for example, the above-mentioned hole of the end wall, formed in particular as a through-opening, can be closed, in particular sealed, wherein, for example, in the completely produce state of the motor vehicle, the grommet is arranged, in particular in the radial direction of the one shaft part, between the one shaft part and at least one wall region of the end wall at least partially delimiting the hole Alternatively or additionally, it is conceivable that the steering shaft is rotatably mounted on the end wall by means of the grommet, so that the steering shaft is rotatable around the axis of rotation in relation to the end wall and preferably in relation to the grommet.

In a further advantageous embodiment of the invention, it is provided that both shaft parts are designed as respective hollow shafts.

To implement particularly simple installation, it is provided in a further design of the invention that one of the shaft parts has a hollow shaft having an internal toothing and the other shaft part has a toothed shaft having an external toothing corresponding to the internal toothing, wherein, for example, the internal toothing and the external toothing are designed as spline toothings or as splines. Therefore, for example, the shaft parts can each be inserted at least partially one inside the other in that the external toothing is inserted into the internal toothing, in particular in an axis of rotation. In this way, the shaft parts are connected to one another in a rotationally-fixed manner. In other words, the external toothing is inserted along the axis of rotation into the internal toothing, whereby the shaft parts are connected to one another in a rotationally-fixed manner via the internal toothing and the external toothing. As a result, the shaft parts can be connected to one another in a particularly simple, rotationally-fixed manner, so that the steering shaft can be installed overall in a time-saving and cost-effective manner.

A second aspect of the invention relates to a motor vehicle which is preferably designed as a passenger car and which has a steering system having at least one steering shaft according to the invention. Advantages and advantageous designs of the steering shaft according to the invention are to be regarded as advantages and advantageous designs of the motor vehicle according to the invention and vice versa.

The invention also includes a method for installing a steering shaft, in particular a steering shaft according to the invention, for a steering system of a motor vehicle, in particular a passenger car. In the method, at least two steering shaft elements of the steering shaft which are formed separately from one another are connected to one another in a torque-transmitting manner in such a way that the steering shaft elements are rotatable around an axis of rotation and are telescopically slidable one inside the other. Furthermore, in the method, a steering wheel of the steering system is mechanically connected to a steering gear of the steering system via the steering shaft elements and thus via the steering shaft, in particular in such a way that torques are transmittable from the steering wheel via the steering shaft elements to the steering gear.

In order to now be able to install the steering shaft in a particularly simple and thus time-saving and cost-effective manner, it is provided that at least one of the steering shaft elements has at least two shaft parts formed separately from one another and connectable or connected to one another in a rotationally-fixed manner, wherein, for example, initially in a first step of the method, initially a first of the shaft parts is installed in a state in which the first shaft part is separate or detached from the second shaft part, i.e., is not yet connected to the second shaft part. In a second step of the method following the first step, while the first shaft part is installed, the second shaft part is installed, in particular in such a way that the second shaft part is connected in a rotationally-fixed manner to the already installed first shaft part. Advantages and advantageous designs of the first aspect and the second aspect of the invention are to be regarded as advantageous designs of the method according to the invention and vice versa.

The method according to the invention is thus also based on the concept of embodying the at least one steering shaft element in multiple parts, in particular at least two parts, to be able to install the shaft parts separately from one another and in particular in succession. In this way, the steering shaft as a whole can be easily handled and thus installed.

Further advantages, features, and details of the invention result from the following description of preferred exemplary embodiments and on the basis of the drawing. The features and feature combinations mentioned above in the description as well as the features and feature combinations mentioned below in the description of the figures and/or merely shown in the figures may be used not only in the combination specified, but also in other combinations or alone, without departing from the scope of the invention.

DETAILED DESCRIPTION

Identical or functionally identical elements are provided with the same reference symbols in the figures.

Figure 1:
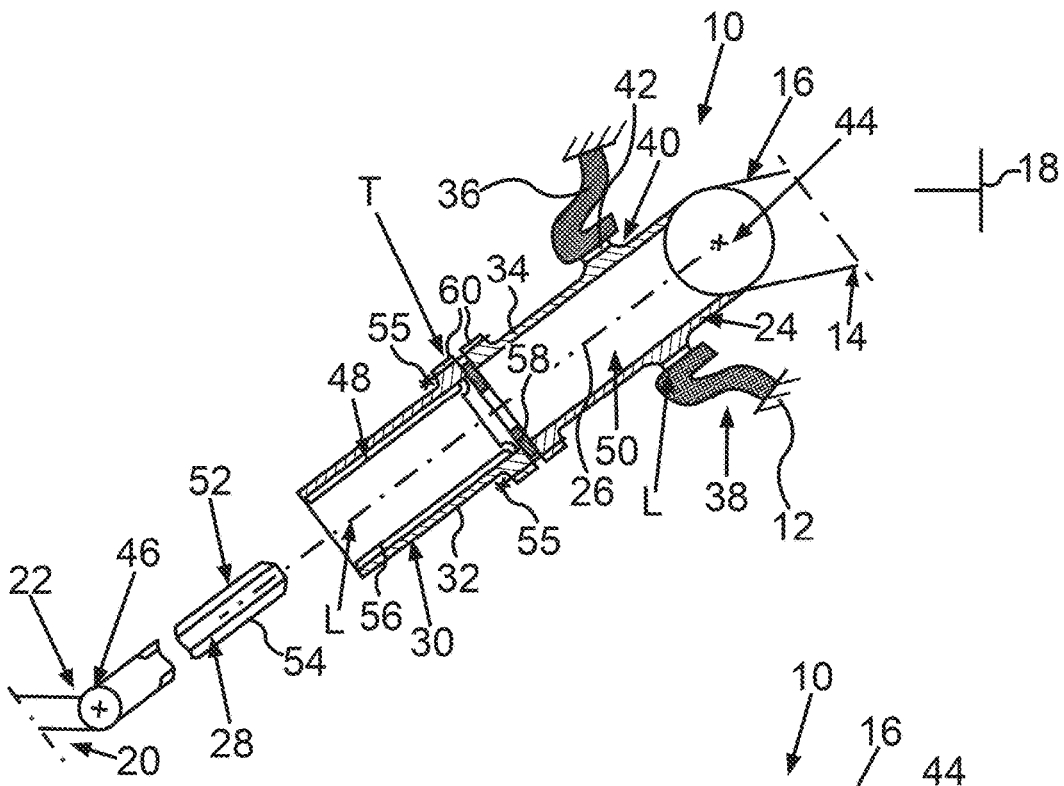
FIG. 1 shows a detail of a schematic and sectional side view of a steering system of a motor vehicle having a steering shaft according to the invention according to a first embodiment.

FIG. 1 shows a detail of a schematic and sectional side view of a steering system 10 for a motor vehicle preferably designed as a passenger car. In its completely produced state, the motor vehicle comprises a structure formed on a self-supporting vehicle body, wherein the self-supporting vehicle body is also referred to as a shell. The vehicle body has, for example, an end wall, a detail of which can be seen in FIG. 1 and is identified by 12. The end wall 12 separates the interior of the motor vehicle in the vehicle longitudinal direction from a region in front of it, also formed as an engine compartment, for example. In addition, in its completely produced state the motor vehicle has wheels, via which the motor vehicle can be supported downward on a roadway in the vehicle vertical direction. If, for example, the motor vehicle is driven along the roadway in a state in which the motor vehicle is supported downward on the roadway in the vehicle vertical direction via the wheels, the wheels thus roll on the roadway. The steering system 10 is used here to pivot and thereby steer at least two of the wheels around respective steering axles in relation to the vehicle body, whereby, for example, direction changes, lane changes, and cornering of the motor vehicle can be effectuated.

The steering system 10 comprises a steering column 14, the lower or front end of which is identified by 16 in FIG. 1. Furthermore, the steering system 10 comprises, for example, a steering wheel 18, which is arranged in the interior of the motor vehicle. The steering wheel 18 can be rotated by a person, in particular the driver of the motor vehicle, wherein the steering wheel 18 is, for example, held on the steering column 14 and in particular is connected in a rotationally-fixed manner to the steering column.

The steering system 10 further comprises a steering gear 20, the interior end of which is identified by 22. At the end 22, the steering gear 20 has, for example, a pinion tower. In addition, the steering system 10 comprises a steering shaft 24, via which the steering wheel 18 is mechanically connectable or connected to the steering gear 20, in particular in such a way that torques exerted on the steering wheel 18 to rotate the steering wheel 18 are transmittable via the steering shaft 24 to the steering gear 20. The wheels are steered by means of these torques, so that the wheels can be steered by the driver via the steering gear 20, the steering shaft 24, the steering column 14, and the steering wheel 18.

The steering shaft 24 is rotatable around an axis of rotation 26 in relation to the vehicle body, to thus cause steering movements of the wheels. In other words, the steering shaft 24 is rotated around the axis of rotation 26 in relation to the vehicle body by means of the steering wheel 18 to thus steer the wheels. The steering shaft 24 comprises at least two steering shaft elements 28 and 30, which are rotatable around the axis of rotation 26 in relation to the vehicle body and are coupled to one another in a torque-transmitting manner, and which are shown in FIG. 1 in a state in which the steering shaft elements 28 and 30 are separate from one another, i.e., are not yet connected to one another in a rotationally-fixed manner. In the completely produced state of the steering system 10 and thus the steering shaft 24, the steering shaft elements 28 and 30 are arranged telescopically one inside the other and are telescopically slidable one inside the other in this way, in particular along the axis of rotation 26.

In the completely produced state of the steering shaft 24, the steering shaft elements 28 and 30 are rotatable around the axis of rotation 26 in order to thus steer the wheels. Overall, it is apparent that the steering wheel 18 is mechanically connectable or connected to the steering gear 20 of the steering system 10 via the steering shaft elements 28 and 30.

The steering shaft 24 is designed here as an intermediate steering shaft, via which the steering column 14 is mechanically connectable or connected to the steering gear 20, in particular in such a way that the torques exerted on the steering well 18 are transmittable from the steering wheel 18 to the steering column 14, from the steering column 14 to the intermediate steering shaft, and from the intermediate steering shaft to the steering gear 20. The steering shaft elements 28 and 30 are formed separately from one another.

In order to be able to install the steering shaft 24 and the steering system 10 as a whole in a particularly simple manner and to be able to implement particularly advantageous accident behavior, the steering shaft element 30 has at least or precisely two shaft parts 32 and 34, which are formed separately from one another and are connected to one another in a rotationally-fixed manner, and which are assembled and connected to one another at a separation point T, wherein the steering shaft elements 28 and 30 are slidable one inside the other across or beyond the separation point T. In this way, the steering shaft elements 28 and 30 can be displaced one inside the other over a particularly large distance, in particular in the event of an accident, so that excessive intrusions into the interior can be avoided.

With respect to a torque flow extending from the steering wheel 18 to the steering gear 20, via which the respective torque is transmitted from the steering wheel 18 to the steering gear 20, the steering shaft element 30 is arranged at least partially, in particular at least predominantly, upstream of the steering shaft element 28, so that the steering shaft element 30 is an upper steering shaft element and the steering shaft element 28 is a lower steering shaft element. In addition, the shaft part 34 is arranged upstream of the shaft part 32 with respect to the torque influence, so that the shaft part 34 is an upper shaft part and the shaft part 32 is a lower shaft part. The shaft parts 32 and 34 are reversibly detachably connected to one another in a rotationally-fixed manner in this case.

The steering shaft 24 furthermore comprises a grommet 36, which is formed, for example, from an elastically deformable material, in particular from an elastically deformable plastic. In particular, the elastically deformable plastic is a rubber. The grommet 36 is held on the shaft part 34, for example, so that the shaft part 34 carries the grommet 36. Therefore, for example, if the steering shaft 24, in particular the shaft part 34 is inserted, for example, with a cockpit into the interior of the motor vehicle, the grommet 36 is thus also inserted in this case, so that, for example, an installation of the shaft part 34 is simultaneously accompanied by an installation of the grommet 36. In the completely produced state, the grommet 36 is connected to the end wall 12, for example, so that at least a partial region of a through-opening 40, also referred to as a hole, of the end wall 12 is at least partially closed by means of the grommet 36. The shaft part 34 penetrates the grommet 36, in particular a through-opening 40 of the grommet 36.

The grommet 36 has a bearing point L having at least one bearing element 42, via which the steering shaft 24 is rotatably mounted on the grommet 36 and via this on the end wall 12. Thus, for example, the steering shaft 24 is rotatable around the axis of rotation 26 in relation to the grommet 36.

A first joint in the form of a first universal joint 44, which is also referred to as the first gimbal joint, is held on the shaft part 34 and thus on the steering shaft element 30. In particular, the universal joint 44 is arranged on an end of the shaft part 34 facing toward the steering column 14 and thus of the steering shaft element 30. The universal joint 44 is an upper universal joint, via which the shaft part 34 and thus the steering shaft element 30 is connected in an articulated manner to the steering column 14. Therefore, the above-mentioned torques can be transmitted from the steering column 14 via the universal joint 44 to the shaft part 34 and thus to the steering shaft element 30.

A second joint in the form of a second universal joint 46, which is also referred to as a second gimbal joint, is held on the steering shaft element 28. The second universal joint 46 is arranged on an end of the steering shaft element 28 facing toward the steering gear 20, so that the steering shaft element 28 is connected in an articulated manner to the steering gear 20 via the second universal joint 46. Therefore, the above-mentioned torques can be transmitted from the steering shaft element 28 via the universal joint 46 to the steering gear 20. FIG. 1 shows a first embodiment of the steering shaft 24. In the first embodiment, both shaft parts 32 and 34 are formed as respective hollow shafts 48 and 50. The steering shaft element 28 has a toothed shaft 52 having a first toothing 54 designed as external toothing. The toothing 54 is, for example, a spline toothing or a spline. The hollow shaft 48 is part of the steering shaft element 30, so that the steering shaft element 30 has the hollow shaft 48 and the hollow shaft 50. In this case, the hollow shaft 48 has a second toothing 56 corresponding to the first toothing 54 and designed as an internal toothing, which is designed, for example, as a spline or spline toothing.

Furthermore, the toothing 54 is at least partially insertable or inserted into the toothing 56, so that the steering shaft elements 28 and 30 are connected to one another in a torque-transmitting manner via the toothings 54 and 56. In addition, the toothings 54 and 56 permit the telescopic sliding of the steering shaft elements 28 and 30 one inside the other. If, for example, an accident-related force application acting, for example, at least along the axis of rotation 26 and at the same time in the direction of the steering wheel 18 occurs, the steering shaft element 28 is thus inserted telescopically into the steering shaft element 30, for example. In this way, for example, an accident-related rearward displacement of the steering gear 20 can be permitted without excessive rearward displacement of the steering wheel 18 occurring. Furthermore, it is possible in this way to slide the steering shaft elements 28 and 30 at least temporarily one inside the other during the installation of the steering shaft 24, to thus shorten the length of the steering shaft 24. In this way, the steering shaft 24 can be handled particularly easily and, for example, moved into the interior.

Because the steering shaft element 30 has the shaft parts 32 and 34 formed separately from one another, the steering shaft element 30 is formed in multiple parts and at least or precisely in two parts here, wherein the shaft parts 32 and 34 are assembled and connected to one another at the separation point T. The shaft parts 32 and 34 are reversibly detachably connected to one another. For this purpose, for example, screws 55 are provided, by means of which the shaft parts 32 and 34 are screwed together and thus reversibly detachably connected to one another in a rotation-locked manner. Furthermore, at least one elastically deformable decoupling element 58 is provided at the separation point T, via which the shaft parts 32 and 34 are supported on one another along the axis of rotation. For example, in the first embodiment the decoupling element 58 is formed from an elastically deformable material, in particular from an elastically deformable plastic, for example rubber. The elastically deformable decoupling element 58 enables acoustic decoupling to be implemented in normal operation, so that, for example, the generation of undesired noises can be avoided.

Since, for example, the steering shaft elements 28 and 30 are telescopically slidable one inside the other, a telescope, also referred to as telescoping, is provided. In particular, a closure cap can be attached to the steering shaft element 28 and/or the steering shaft element 30 during the installation. The telescope can be sealed by means of the sealing cap, for example, in order to prevent a lubrication material for lubricating the telescope from escaping from it. The closure cap, which is also simply referred to as a cap, can be embodied in such a way that it is passed over without great effort in case of an accident. In the first embodiment, the shaft parts 32 and 34 are connected to one another, in particular reversibly detachably, via respective flanges 60 designed as screw flanges, in such a way that the shaft parts 32 and 34 are screwed together by means of the flanges 60. Alternatively or additionally, the shaft parts 32 and 34 are connected to one another, for example, by means of at least one thread, possibly in combination with a lock nut, by means of a press fit, possibly in combination with a clamp, by means of a bayonet fitting, by means of a sintered ring, and/or in a spring-loaded manner.

While the shaft part 32 has the toothing 56, the shaft part 34 is formed without teeth, for example. The toothing 56 is arranged in a hollow length region L of the shaft part 32, wherein the hollow length region L has a first internal diameter. In this case, for example, the hollow shaft 50 has a second internal diameter that is larger than the first internal diameter, so that, for example, the toothed shaft 52 can be inserted into the hollow shaft 50 along the axis of rotation 20 in case of an accident. The shaft part 34 thus does not necessarily need a shaft profile.

Figure 2:
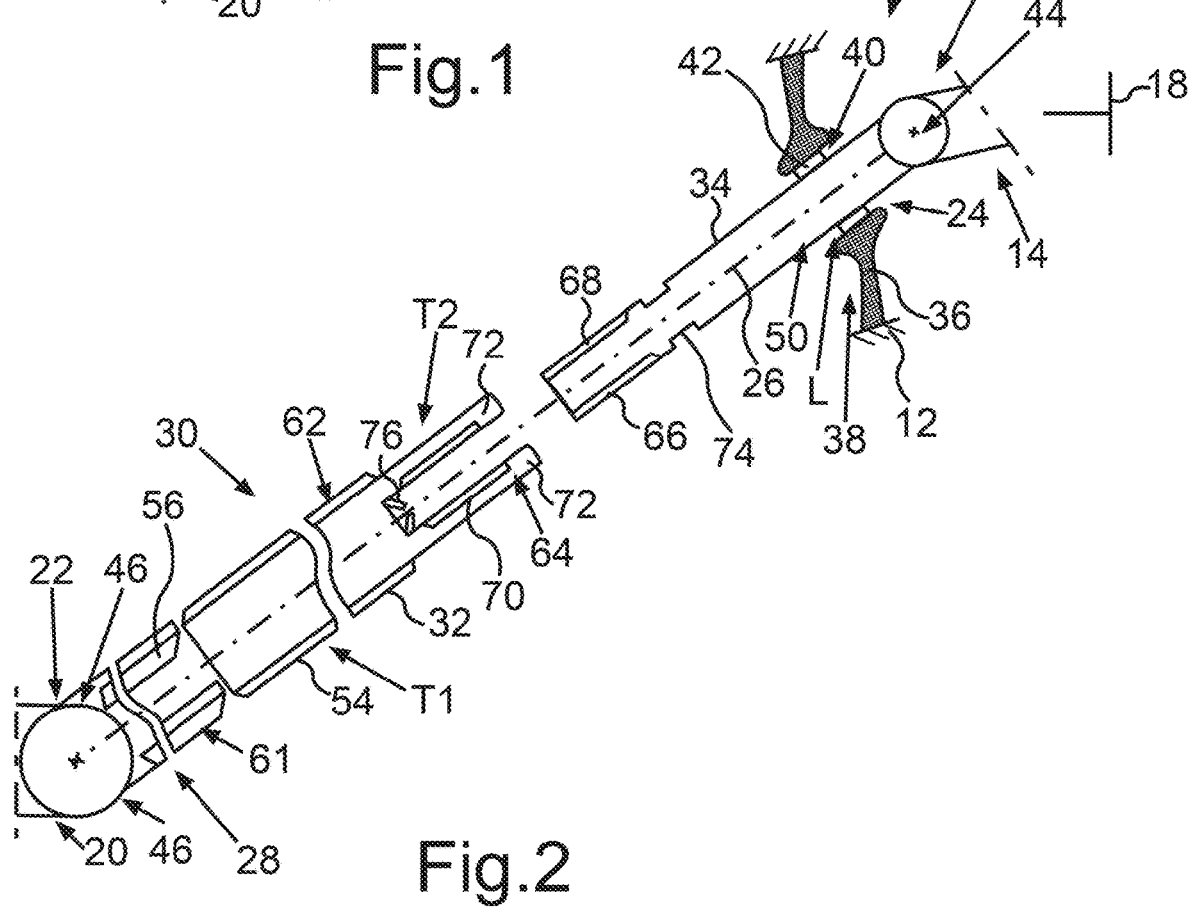
FIG. 2 shows a detail of a schematic and sectional side view of the steering system having the steering shaft according to a second embodiment.

FIG. 2 shows a second embodiment of the steering shaft 24. The second embodiment differs in particular from the first embodiment in that the steering shaft element 28 is designed as a first hollow shaft 61, while the shaft part 32 is designed as a first toothed shaft 62 in a first partial region T1. In a second partial region T2, the shaft part 32 is designed as a second hollow shaft 64, wherein the second partial region T2 adjoins the first partial region T1 along the axis of rotation 26 toward the shaft part 34. The shaft part 34 is designed as a second toothed shaft 66. In other words, the steering shaft element 28 has the hollow shaft 61, wherein the shaft part 32 has the toothed shaft 62 and the hollow shaft 64. Furthermore, the shaft part 34 has the toothed shaft 66. The toothed shaft 62 has a first toothing 54 in the form of an external toothing, wherein the hollow shaft 61 has a second toothing 56 corresponding to the first toothing 54 and designed as an internal toothing. The toothed shaft 62 is at least partially inserted into the hollow shaft 61 by the toothing 54 being inserted into the toothing 56. In this way, the shaft part 32 is connected in a torque-transmitting manner to the steering shaft element 28 via the toothings 54 and 56, wherein the toothings 54 and 56, which are designed, for example, as spline toothings or splines, permit the telescopic sliding of the steering shaft elements 28 and 30 one inside the other.

The toothed shaft 66 has a third toothing 68 in the form of an external toothing, wherein the hollow shaft 64 has a fourth toothing 70 in the form of an internal toothing. The fourth toothing 70 corresponds to the third toothing 68, so that the toothed shaft 66 is at least partially inserted into the hollow shaft 64 along the axis of rotation 26, by the toothing 68 being at least partially inserted into the corresponding toothing 70. As a result, for example, the shaft parts 32 and 34 are connected to one another in a torque-transmitting manner via the toothings 68 and 70, so that the shaft parts 32 and 34 are connected to one another in a rotationally-fixed manner via the toothings 68 and 70. For example, since the respective external toothing is designed as a spline, the respective toothed shaft is designed as a respective spline shaft.

For example, to secure the shaft parts 32 and 34 to one another also along the axis of rotation 26 and thus in the axial direction of the steering shaft 24, the shaft parts 32 and 34 are connected to one another in a form-fitting manner along the axis of rotation 26, for example. For this purpose, for example, the shaft part 32 has at least one or more first form-fitting elements 72, wherein the shaft part 34 has at least one or more second form-fitting elements 74. The respective formfitting element 72 is designed, for example, to engage in the corresponding formfitting element 74, whereby the shaft parts 32 and 34 are connectable or connected to one another in a formfitting manner along the axis of rotation 26 and thus secured to one another. In particular, the respective formfitting element 72 is designed as a latching element or as a clip, which is held, for example, in a resilient or elastically deformable manner on the base body of the shaft part 32. If, for example, the shaft part 34 is inserted into the hollow shaft 64, the respective formfitting element 72 is thus initially elastically deformed. If, for example, the respective formfitting element 72 is brought into overlap with the formfitting element 74, the respective formfitting element 72 can thus spring back elastically and thereby engages in the formfitting element 74. In this way, the shaft parts 32 and 34 are connected to one another in a formfitting manner or locked to one another. The shaft parts 32 and 34 are thus held together by at least one clip along the axis of rotation 26.

For example, in order to avoid excessive relative movements between the shaft parts 32 and 34 extending along the axis of rotation 26, for example, at least one spring 76 is provided, which is preferably arranged in the hollow shaft 64. The spring 76 is tensioned, for example, and thereby provides a spring force which acts in particular along the axis of rotation 26. In this way, for example, the shaft part 34 is held along the axis of rotation 26 in defined support contact with the shaft part 32, so that excessive relative movements and noises resulting therefrom, in particular rattling noises, can be avoided.

The invention claimed is:

1. A steering shaft for a steering system of a motor vehicle, comprising:
   at least two steering shaft elements, which can be rotated about an axis of rotation, are coupled to one another in a torque-transmitting manner, and are telescopically slidable one inside the other, via which a steering wheel is mechanically connectable to a steering gear of the steering system,
   wherein at least one of the at least two steering shaft elements has at least two shaft parts, wherein one of the at least two shaft parts has a hollow shaft with an internal toothing and the other shaft part has a toothed shaft with an external toothing corresponding to the internal toothing, which are formed separately from one another and are connected to one another in a rotationally-fixed manner and which are assembled and connected to one another by at least one separation point, wherein the at least two steering shaft elements are slidable one inside the other beyond the separation point.

2. The steering shaft as claimed in claim 1, wherein the at least two steering shaft elements are connected to one another in a torque-transmitting manner via the toothings, which permit the telescopic sliding of the at least two steering shaft elements one inside the other beyond the separation point.

3. The steering shaft as claimed in claim 2, wherein a universal joint, is held on at least one of the at least two steering shaft elements.

4. The steering shaft as claimed in claim 3, wherein the at least one toothed shaft is slidable along the axis of rotation through the hollow shaft and beyond the separation point into supporting contact with the universal joint.

5. The steering shaft as claimed in claim 1, wherein at least one elastically deformable decoupling element is provided at the separation point, via which the at least two shaft parts are supported against one another along the axis of rotation.

6. The steering shaft as claimed in claim 1, wherein at least one of the at least two steering shaft elements is arranged upstream of a second steering shaft element with respect to a torque flow extending from the steering wheel to the steering gear.

7. The steering shaft as claimed in claim 1, wherein the at least two shaft parts are reversibly detachably connected to one another in a rotationally-fixed manner.

8. The steering shaft as claimed in claim 1, wherein a rubber grommet is held on a first shaft part of the at least two shaft parts and is penetrated by the first shaft part.

9. The steering shaft as claimed in claim 1, wherein the at least two shaft parts are designed as respective hollow shafts.

10. The steering shaft as claimed in claim 1, wherein the external toothing is inserted into the internal toothing along the axis of rotation, whereby the at least two shaft parts are connected to one another in a rotationally-fixed manner via the internal toothing and the external toothing.

11. The steering shaft as claimed in claim 2, wherein a universal joint, is held on at least one of the at least two steering shaft elements.

12. The steering shaft as claimed in claim 3, wherein the toothed shaft is slidable along the axis of rotation through the hollow shaft and beyond the separation point into supporting contact with the universal joint.

13. The steering shaft as claimed in claim 2, wherein at least one elastically deformable decoupling element is provided at the separation point, via which the at least two shaft parts are supported against one another along the axis of rotation.

14. The steering shaft as claimed in claim 3, wherein at least one elastically deformable decoupling element is provided at the separation point, via which the at least two shaft parts are supported against one another along the axis of rotation.

15. The steering shaft as claimed in claim 4, wherein at least one elastically deformable decoupling element is provided at the separation point, via which the at least two shaft parts are supported against one another along the axis of rotation.

16. The steering shaft as claimed in claim 2, wherein the first steering shaft element is arranged upstream of the second steering shaft element with respect to a torque flow extending from the steering wheel to the steering gear.

17. The steering shaft as claimed in claim 3, wherein the first steering shaft element is arranged upstream of the second steering shaft element with respect to a torque flow extending from the steering wheel to the steering gear.

18. The steering shaft as claimed in claim 4, wherein the first steering shaft element is arranged upstream of the second steering shaft element with respect to a torque flow extending from the steering wheel to the steering gear.

19. The steering shaft as claimed in claim 5, wherein the first steering shaft element is arranged upstream of the second steering shaft element with respect to a torque flow extending from the steering wheel to the steering gear.

20. The steering shaft as claimed in claim 2, wherein the at least two shaft parts are reversibly detachably connected to one another in a rotationally-fixed manner.

* * * * *